ical Patent [19] [11] 3,949,878
Doane, Tuthill [45] Apr. 13, 1976

[54] APPARATUS FOR PROTECTIVELY MOUNTING AN OBJECT

[76] Inventor: Doane, Tuthill, 373 School St., Westbury, N.Y.

[22] Filed: Feb. 24, 1975

[21] Appl. No.: 552,416

[52] U.S. Cl. .................................. 206/521; 248/22
[51] Int. Cl.² .................... B65D 81/02; B65D 85/30
[58] Field of Search .............. 206/521, 320; 217/54; 248/22, 21, 20, 358

[56] References Cited
UNITED STATES PATENTS

| | | | |
|---|---|---|---|
| 2,144,848 | 1/1939 | Miller | 248/22 |
| 2,260,029 | 10/1941 | Hull | 248/22 |
| 2,289,514 | 7/1942 | Mastney et al. | 248/20 |
| 2,441,509 | 5/1948 | Robinson | 248/22 |
| 2,674,433 | 4/1954 | Mautner | 206/521 |

Primary Examiner—William T. Dixson, Jr.

[57] ABSTRACT

An apparatus for protectively mounting an object including a support member that can be positioned under an object while the object rests on the ground or other given plane. A resilient shock absorbing member, that has a first portion resting against the ground and second portion, isolated from shock and vibration with respect to the first portion, is connected to the ends of the support member. A screw-type elevating device serves both to join the support member to the isolated portion of the shock absorbing member and to adjustably elevate the support member with respect to the grounded first portion. As the support member raises, it first contacts the object and, thereafter, lifts the object off the ground plane leaving the object protectively mounted.

13 Claims, 7 Drawing Figures

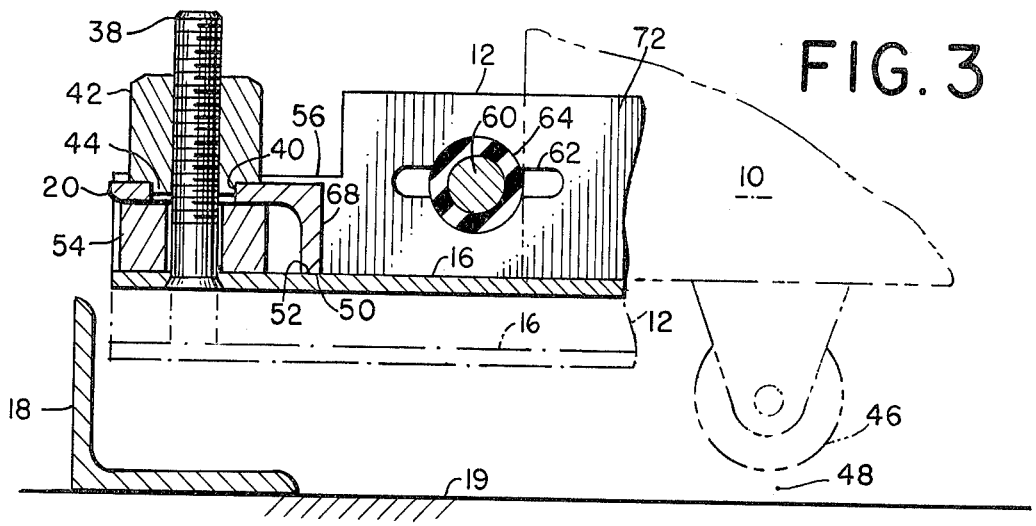
FIG. 3
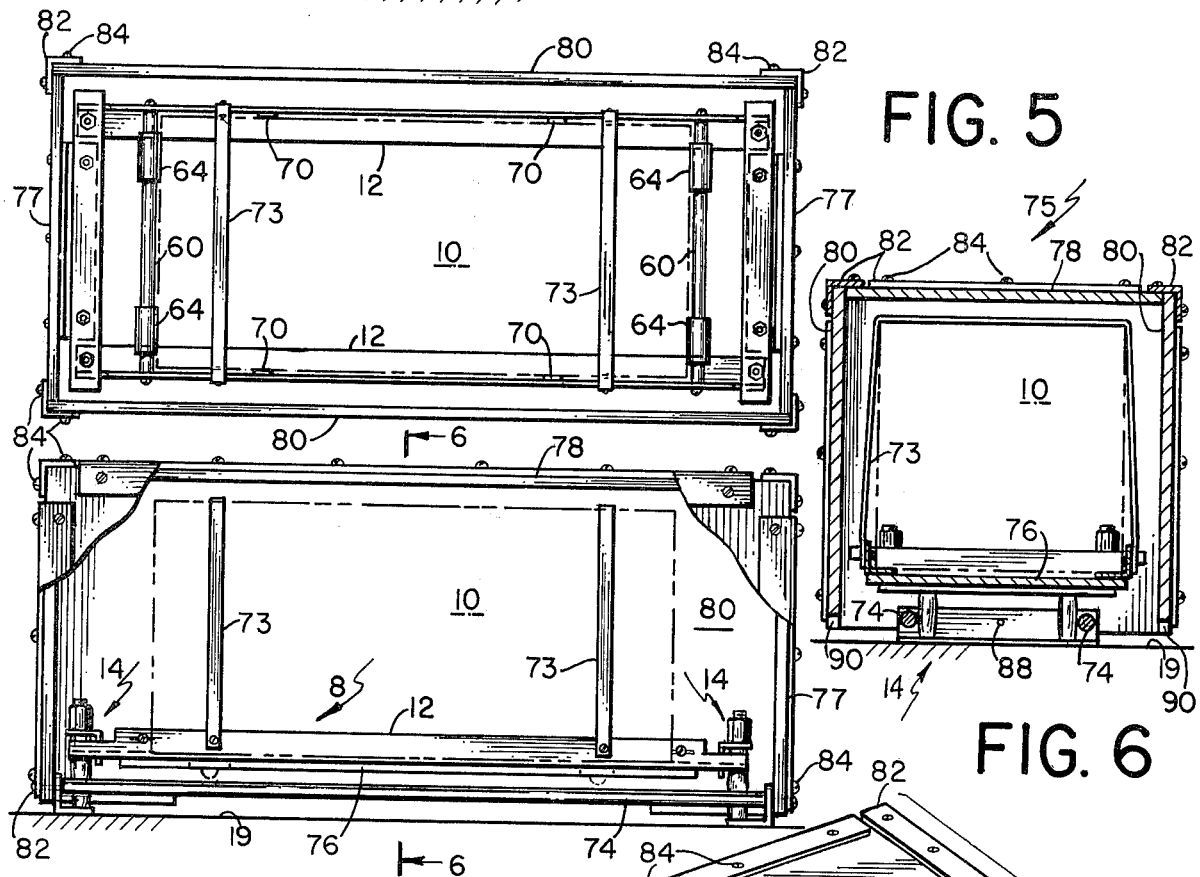
FIG. 5
FIG. 4
FIG. 6
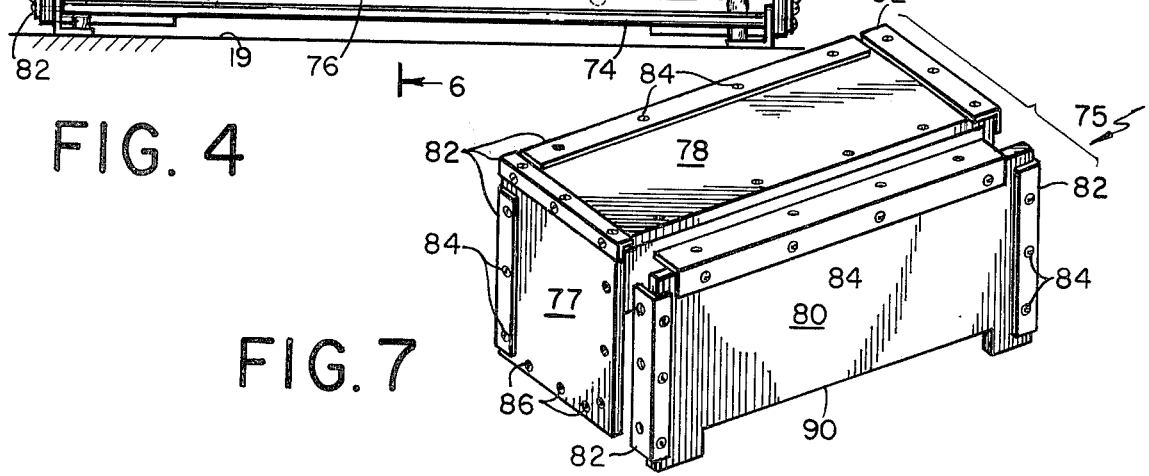
FIG. 7

APPARATUS FOR PROTECTIVELY MOUNTING AN OBJECT

BACKGROUND OF THE INVENTION

The present invention relates to an apparatus for protectively mounting an object. Such protection is afforded when the object rests on a shock-mounted support that is isolated from the ground by means of resilient shock absorbing elements. Shock mountings can be designed to absorb or to attenuate, to an acceptable value, redundant forces and dampen vibrations that would otherwise be transmitted into the object and possibly damage it. These redundant forces could arise from shock or impact due to severe or careless handling, by vibration such as could be encountered when the object is being carried on a moving conveyance, or by combinations of shock and vibration. The design of shock absorbers is accomplished by applying well known equations of vibration dynamics to the parameters of the particular system of components and elements involved. In the present disclosure, the term shock absorbers will be understood to include resilient members capable of absorbing vibrations as well as shock.

A known technique for protecting machinery, delicate instruments, and the like is to place them onto or in a shock absorbing support apparatus or container that has been designed for the application. Although the particular object is protected after it is securely installed into its protective means, the very procedure of installing the object can itself cause damage, particularly if the object is heavy and/or delicate. Manual, or external mechanical lifting devices such as fork lifts, cranes, ramps, pry bars and the like are usually employed, and the possibility of imposing a force or forces severe enough to damage the still unprotected object is apparent. Similarly, during the procedure of removing the object from its shock absorbing apparatus it is again vulnerable to damage, perhaps more so since loading equipment available at the location where the object was prepared for shipping often times is not available at the location where the object is to be installed.

SUMMARY OF THE INVENTION

It is the principal object of this invention to provide an apparatus that can coact with an object that is resting on the ground, said apparatus including means to raise the object off the ground while shock-mounting the object. The object is essentially protectively shock mounted as it is elevated due to the construction of the apparatus. The object so mounted can then be operated, stored and transported. The object may be dismounted by reversing the operation of the raising means thus leaving the object again resting on the ground and free of the apparatus.

It is a further object of this invention to provide means to secure the object to the shock-mounting apparatus to prevent shifting or joggling of the object with respect to the apparatus A still further object of this invention is to provide an enclosure surrounding the object to provide a barrier against damage. The enclosure is fastened to the grounded portion of the protective apparatus so as not to transmit shock or vibration forces directly to the object.

A still further object of this invention is to provide a carrying beam, also fastened to the grounded portions of the shock absorbing members, to enable conveyance of the mounted object.

A still further object of this invention is to provide a means for similarly shock-mounting an object, such as a motor or an engine that would permit such a vibrating mechanism to move freely without transmitting that movement to its foundation. The shock mounting means would also reduce the noise associated with vibration.

These and other objects are achieved by this invention which provides for an apparatus for shock-mounting an object so that the object, while resting on the ground, can be easily installed onto a shock-mounted support frame without the use of external lifting means. According to the present invention, a pair of lifting members is positioned underneath the object as it rests on the floor. The ends of the lifting members are attached to the resiliently supported portion of a pair of shock-absorbing members by means which comprises, in a preferred embodiment, threaded studs fixed to the lifting members and freely rotating elevating nuts piloted in the shock absorbing members and engaging the threaded studs. Rotating the elevating nuts, therefore, draws the threaded studs upward by and raises the lifting members. The lifting members first contact the object and with continued rotation of the elevating nuts, the lifting members raise the object off the ground plane to a position wherein it is supported on the shock-mounted frame. Complete tightening of the elevating nuts will rigidly join the lifting members to the shock-absorbing member. No external devices, but a normal wrench for driving the elevating nuts, are employed.

Having in mind the above and other objects that will be obvious from an understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawings.

BRIEF DESCRIPTION OF THE DRAWINGS

The invention will be described in more detail, by way of example, with reference to the accompanying drawings, in which:

FIG. 3 is a sectional view taken along line 3—3 in FIG. 1;

FIG. 4 is a broken-out elevational view of the apparatus and enclosure;

FIG. 5 is a plan view of the apparatus and enclosure with the top removed;

FIG. 6 is a sectional view taken along line 6—6 in FIG. 4; and

FIG. 7 is a perspective view of the enclosure.

DETAILED DESCRIPTION OF THE PREFERRED EMBODIMENTS

Figure 1:
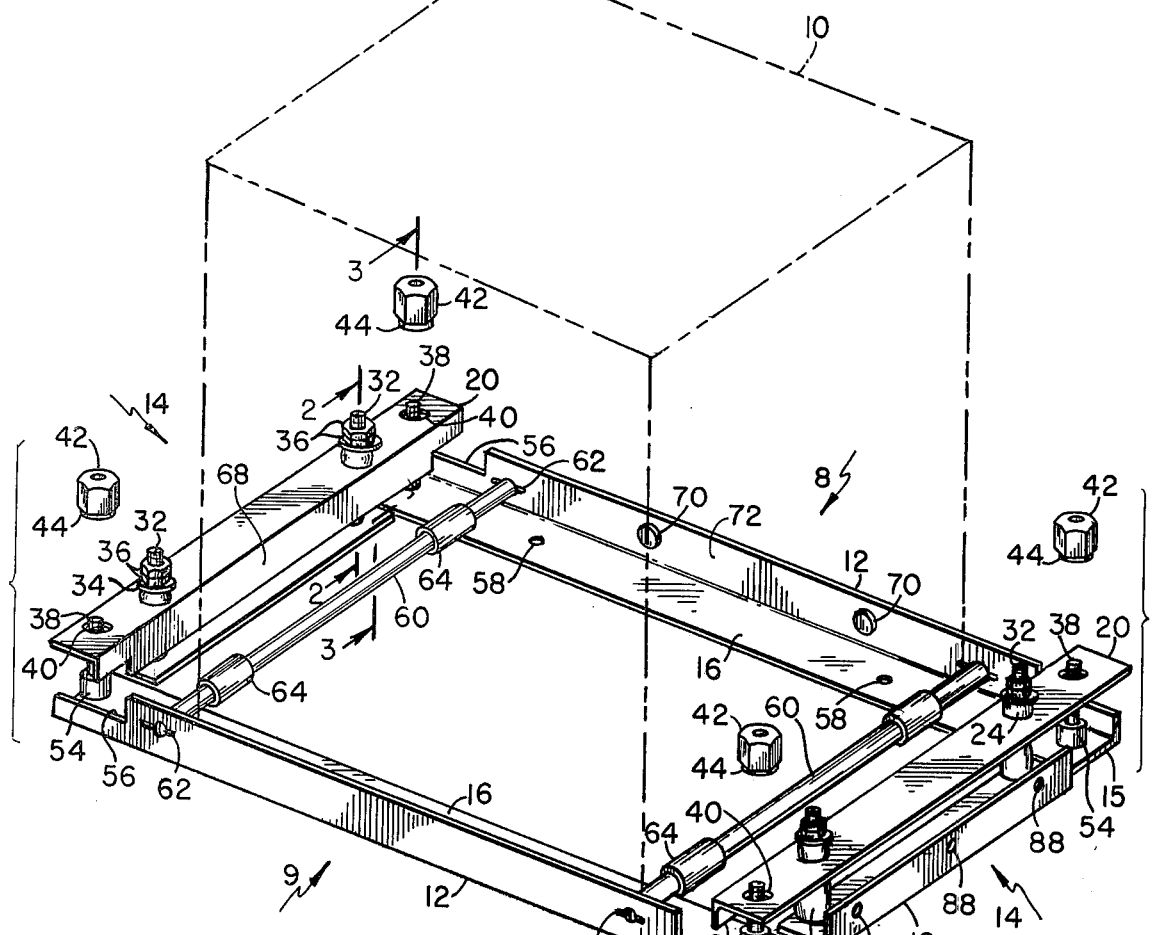
FIG. 1 is a perspective view of the apparatus embodying the invention.

Referring to FIG. 1 of the drawings, in accordance with this invention an apparatus 8 is provided for protectively mounting an object 10 that is initially resting on the ground or any other given plane. The apparatus 8 includes a support means 9 that is comprised of a pair of lifting members 12, designed to be inserted under the object 10 to be mounted. The lifting members 12 engage with a pair of resilient shock-mounting members 14, each positioned across an end of each lifting members 12. A preferred means for engaging the end of the lifting members 12 to the shock absorbing member 14 comprises a screw-type mechanism to be explained in detail later, that can be utilized to connect, drawup and clamp the lifting member 12 to the resilient shock-mounting members 14. When so engaged, the lifting members 12 become part of the resilient shock-mounting members and, in effect, are themselves shock-mounted. The proportions of the apparatus 8 are selected to allow the lifting members 12 to coact with the object 10 so it may be lifted off the ground plane.

In a preferred embodiment, the lifting members 12 are made from steel having an L shaped cross-section. This shape permits using one leg 15 of the "L" as a lifting surface 16, and since it has a low profile, it can therefore be inserted under an object having little ground clearance. The L-shape has a high section modulus with respect to its area. It therefore affords high bending resistance and is a common lowcost shape offered by most metal fabricators.

The lifting members 12 may be bridged by one or more connecting braces (not shown) secured to corresponding portions of each lifting member 12 forming a single member that has greater rigidity and offers more support to the underside of the object 10. It is an essential part of this invention that whatever type of lifting member 9 is employed, its lifting surface 16 be positionable under the object itself or under a portion of the object that may be used for lifting purposes.

The pair of shock absorbing members 14 are each comprised of a first portion or lower rail 18 resting against the ground plane 19, a second portion or upper rail 20 isolated or shock mounted with respect to the first rail 12, at least two first or weight bearing shock absorbing members 22, an equal number of second or rebound shock absorbing members 24, and associated mounting hardware that will be described later in detail. A more detailed illustration of the shock-mounting 14 can be seen by referring to FIG. 2. The first shock absorbing members 22 are positioned between the lower and upper rails 18 and 20 respectively. The second shock absorbing members 24 are positioned above the upper rail 20 and in axial alignment with the first shock absorbing members 22.

A threaded bolt 32, passes upwardly through, in turn, an opening 33 in the lower rail 18, a throughbore in the first shock absorbing member 22, an opening 30 in the upper rail 20, a throughbore in the second shock absorbing member 24, a load distributing washer 34 and is engaged by a pair of jam nuts 36. The threaded bolt 32 can be prevented from rotating when tightening the jam nuts 36 either by inserting a screwdriver into slot 35 in the end of the threaded bolt 32, or by providing a square or other non-circular shaped cross-section to a portion of the threaded bolt 32 under the head 37 (not shown). In this case, the opening 30 would have a similar shape thereby preventing bolt rotation. In either design, the size of the opening 30 is sufficiently larger than the portion under the head 37 of the threaded bolt 32, so that the bolt 32 can pivot about its head 37 if sidewise forces are impressed into the shock mounting members. In this way, the resilient shock absorbers can effectively dampen these shearing forces without being unduly inhibited by the bolts 32. Concentric neck portions 26 and 28 of each of the first and second shock absorbing members 22 and 24 respectively closely fit into holes 30 in the upper rail 20. These neck portions 26 and 28, serve to retain the shock absorbing members with respect to the upper rail 20 and prevent the threaded bolt 32 from contacting the upper rail 20 thereby effectively isolating the two rails from one another. Therefore, any force or motion induced in the lower rail 18 of the shock-mounting member 14 will be reflected through the shock absorbers 22 and 24 before reaching the upper rail 20 and will thereby be attenuated or dissipated before it is felt by the object. The roles of the upper and lower rails 20 and 18 are reversed when mounting moving mechanisms, but the shock and vibration absorbing effect is unchanged. The shock absorbing members 22 and 24 can comprise resilient elements such as mechanical springs, hydraulic or pneumatic cushioners or pads made of elastomers. A dashpot can be installed in parallel with a mechanical spring type of shock absorbers to provide sufficient damping action for quickly attenuating the amplitude of vibratory motion and bring the object to rest. In a preferred embodiment, an elastomer such as neoprene is used. This material is available in a wide range of durometer values having various resiliencies, has inherent internal damping, retains its characteristics when exposed to varying ambient conditions and is comparatively low in cost.

The means for assembling the elastomers to the rails is made adjustable so a predetermined compressive force or preload can be set into the shock absorbing members 22 and 24. The advantage of compressing the shock absorbing members 22 and 24 before any weight is applied is to allow the weight bearing shock absorber 22 to compress a minimum amount as the static load (the weight of the object 10) is transferred to it during the loading procedure as will be explained later. The jam nuts 36 can be reset to relax any excessive load in the shock absorbing members 22 and 24 after the object 10 is mounted. It is usually sufficient that the preloading of the shock absorbing member 22 be only slightly more than that portion of the static weight of the object 10 that each is required to support. In this way, most of the effect of preloading is cancelled as soon as the object 10 is lifted. Without the preloading ability, the weight bearing shock absorbing member 22 would compress from the applied weight of the object 10 and the rebound shock absorbing member 24 would not be constrained between the upper rail 20 and the load distributing washer 34. The preload, therefore, assures that the integrity of the system will be maintained when shock, vibration or other dynamic forces are introduced in an upward direction; a condition that occurs frequently in material handling and shipping.

In engaging the ends of the lifting members 12 to the upper rail 20 an elevating mechanism, to be described in detail later, for mounting and adjustably elevating the lifting members 12 is employed. Thus the lifting members 12 can be elevated; the lifting surfaces 16 first contact the object 10 and, by continued actuation of the elevating mechanism, the object 10 is lifted off the ground.

Referring now to FIG. 3, there is shown a detailed illustration of the preferred elevating means. Threaded elevating studs 38 are secured to each end of lifting members 12 substantially perpendicular to and extending upward from the lifting surface 16. The elevating studs 28 pass through apertures 40 such as holes or slot in the lifting members 12. Each elevating stud 38 is engaged by an elevating nut 42. The elevating nuts 42 have a concentric neck portion 44 that closely mates with the aperture 40 in order to prevent the threads of the elevating stud 38 from rubbing against the sides of aperture 40 and being deformed.

Figure 2:
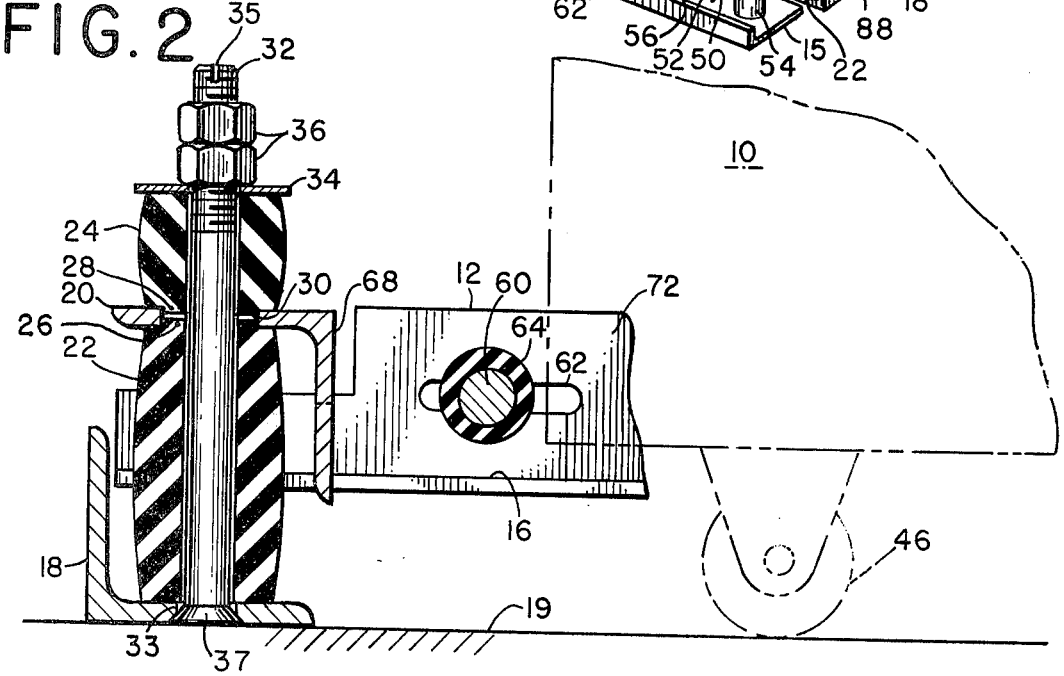
FIG. 2 is a sectional view taken along line 2—2 in FIG. 1.

At the initial engagement of the elevating nuts 42 with the elevating stud 38, the lifting surfaces 16 have not yet contacted the object 10. The relative position of the lifting surfaces 16 with respect to the object 10 can be seen by referring back to FIG. 2. This same position is shown in phantom linework in FIG. 3 illustrating the lifting member 12. The legs or casters 46 supporting the object 10 are in contact with the ground plane 19 as shown in FIG. 2. By continued sequential tightening of the elevating nuts 42, the lifting surfaces 16 are raised approximately parallel to the ground plane 19 and first contact the underside of the object 10 and thereafter lift it off the ground plane 19 creating a space 48 between the casters 46 and the ground plane 19 equal to the height the object 10 had been lifted.

The amount of space 48 finally attained is determined by the banking of the lifting member 12 against the upper rail 20. A banking surface 50 is cut into the upper rail 20 to bear against a corresponding surface 52 of the lifting member 12. The object 10 is fully elevated when these surfaces bear against each other. The contact pressure effectively rigidizes the connection between the lifting member 12 and the upper rail 20.

In the preferred embodiment, a spacing collar 54 is placed over the elevating stud 38 between the lifting member 12 and the upper rail 20. The height of the spacing collar 54 is chosen so that the collar is contacted simultaneously from below and above by the lifting member 12 and the upper rail 20 respectively just as the banking surface 50 contacts the corresponding surface 52 of the lifting member 12. The addition of the spacing collar 54 around the axis of lifting eliminates the bending moment created when the only banking surfaces points are offset from the axis of the elevating stud 38.

The elevating nuts 42 can include gripping means such as a fluted knob (not illustrated) for hand tightening. They can also be tightened with hand tools such as a wrench. To facilitate the manipulation of the tool, clearance notches 56 are provided in ends of the lifting members 12 for access to the elevating nuts 42.

The screw-type elevating means described is the preferred but only one of several types of lifting mechanism available that could be used. Others which have not been illustrated include cams, linkages and wedges acting between the upper rails 20 and the lifting members 12.

The object 10, now protectively mounted on the lifting members 12 can be constrained from moving relative to the lifting surfaces 16 and parallel to the ground plane 19. Several means are available for affixing the object 10 to the lifting members 12 including fastening the object 10 directly to the lifting members 12 through a series of holes 58 in lifting members 12. These holes necessarily must align with corresponding fastening means such as tapped holes in the object 10.

The preferred means incorporates a pair of braces 60 each one fastened to each of the lifting members 12 as shown in FIGS. 1 through 5. The receiving apertures 62 in the lifting members 12 may be holes or slots parallel to the long axis of lifting member 12 so the braces 60 may be brought up against the sides of the object 10. Cushioning sleeves 64 made of rubber or similar material are fitted over the braces 60 to prevent marring the surface of the object 10.

Another embodiment, the apparatus 8 can be proportioned so that the vertical surfaces 68 of the upper rails 20 would be located in close proximity to opposite sides of the object 10 after it is mounted. Cushioning material (not shown) would be inserted between the object 10 and the vertical surface 68 to protect the object 10.

Similar cushioning pads 70 mounted in vertical sides 72 of the lifting members 12 are employed to prevent movement of the object 10 in a direction parallel to the braces 60. The mounted object 10 now constrained against moving along the lifting surfaces 16 can be prevented from raising off the lifting surfaces as might occur if redundant forces would urge the object 10 to bounce or joggle. Referring to FIGS. 4, 5 and 6 several flexible straps 73 are wrapped over the object 10 holding it against the lefting members 12.

The shock-mounting apparatus 8, having the object 10 secured thereto, can also have means for lifting the total assemblage if it is to be conveyed. Such means can be secured to a ground portion of the apparatus 8 such as the lower rails 18 so that the entire apparatus 8, together with the mounted object 10, can be lifted without applying a load directly to the object 10. In the preferred embodiment, at least two beam members 74 have ends fastened to corresponding points on the lower rails 18 as shown in FIGS. 4 and 5. Additional beam members may be inserted between the lower rails 18 or extensions thereof in addition to the two described if the weight or size of the object 10 requires it. These beam members 74 are situated sufficiently above the ground so a lifting device may be inserted under them to lift the assemblage and not disturb the protective mounting afforded the object in accordance with this invention.

The mounted object 10, now secured to the shock-mounting apparatus 8 can be covered to prevent direct contact of the object 10 by other objects and also to prevent exposure to the environment. Firstly, a lower cover member or bottom plate 76 is fastened to the support members 12 to cover the underside of the object. The lower cover member cannot be disposed lower than the beam members 74.

In the embodiment of FIG. 7, an enclosure 75 comprising planar panels including a pair of first sides 77, a top 78 and a pair of second sides 80. These panels normally would be fabricated of wood or composition board. The panel members 77, 78 and 80 are assembled to form an enclosure 75 by utilizing metal angle braces 82 to join the panels at the edges to form the enclosure that fits around the mounted object 10. The braces 82 are fastened to peripheral portions of corresponding panels and fastened with screws 84 passing through holes in the braces 82 and engaging threaded inserts (not shown) in the panels.

The enclosure 75, so assembled, is then fitted over the mounted object 10 and fastened with screws (not shown) to the lower rails 18 through holes 86 in the lower peripheral edge of both first sides 77, and mating with corresponding threaded holes 88 in the rails. Since the lower rails 18 are grounded members, the enclosure 75 is isolated from the object. Thusly, in accordance with this invention, any force sustained by the enclosure 75 is not directly transmitted to the mounted object 10.

Large or heavy enclosures 75 are assembled except for one second panel 80. The open enclosure could then more easily be fitted over the mounted object 10 and then fastened to the lower rails 18 as previously indicated. Cutouts 90 in the lower periphery of each of the second side panels 80 provides access for lifting devices for transporting the apparatus 8 protectively supporting the object 10, and the protective enclosure 75 as a single unit.

It can be readily seen that all the components cooperating to form the present invention are used in their basic forms with no permanently assembled parts required. Therefore, the apparatus 8 can be disassembled, stored or returned to the original shipping location for reuse. The components can be packaged in a very compact form for shipping and storage because of the flat or narrow cross-sectional area of these parts.

While preferred and other exemplary embodiments of the invention are illustrated and/or described, it will be understood that the invention is in no way limited to these embodiments.

What is claimed is:

1. Apparatus for protectively mounting an object resting on a given plane and having a peripheral underportion located at a given distance above the given plane, said apparatus comprising:
    support means having a lifting portion positionable beneath the peripheral underportion of the object to be mounted, said lifting portion having a height less than the given distance;
    shock absorbing means including a first portion resting against the given plane and a second portion isolated from shock with respect to said first portion and wherein said second portion is mountable to the support means while said support means is positioned under the object; and
    adjustable elevating means disposed on said support means and said second portion of said shock absorbing means for mounting said support means with respect to said second portion for elevating movement from a non-supporting position, first into contact with the peripheral underportion of the object being mounted and thereafter into a supporting position thereby elevating and protectively mounting the object above the given plane.

2. Apparatus according to claim 1, wherein said adjustable elevating means comprises a plurality of first elevating elements each in contact with said support means, a plurality of second elevating elements each in contact with said second portion of said shock absorbing means and means connecting each first elevating element to a corresponding second elevating element to effect the elevating movement.

3. Apparatus according to claim 2, wherein said support means includes a pair of lifting members.

4. Apparatus according to claim 3, wherein said shock absorbing means further includes
    a plurality of first and second resilient members, each of said first resilient members disposed between said first and second portions of said shock absorbing means and each of said second resilient members disposed above said second portion and in alignment with one of said first resilient members, and
    means for selectively fixing the distance between each of said first portions and the top of each of said second resilient members.

5. Apparatus according to claim 4, wherein end portions of said second portions of said shock absorbing means include a plurality of apertures therethrough and wherein said plurality of first elevating elements includes a plurality of threaded studs, each secured to and disposed vertically upward from the end portions of each of said lifting members and each associated with and passing through one of said apertures, wherein said plurality of second elevating elements includes a plurality of elevating nuts, each receivable in one of said apertures and bearing against an upper portion of said second portion, wherein said connecting means includes the threaded engagement of each nut with one of said threaded studs to effect the elevating of said lifing members in response to the rotation of said elevating nut in the tightening direction and wherein the apparatus further comprises means for limiting elevation.

6. Apparatus according to claim 5, wherein said means for limiting elevation includes first banking surfaces disposed on said lifting member and second banking surfaces disposed on said second portion of said shock absorbing member and cooperative with said first banking surfaces to contact same upon continued elevation of said lifting members thereby limiting further elevating movement.

7. Apparatus according to claim 3, further comprising means for affixing the mounted object to said lifting members when said support means is in the supporting position.

8. Apparatus according to claim 7, further comprising means for constraining the mounted object against movement parallel to the given plane.

9. Apparatus according to claim 8, wherein the constraining means includes a pair of braces, each affixed to corresponding portions of each of said lifting members and bearing against opposite sides of the mounted object.

10. Apparatus according to claim 9, further comprising a cover member fastened to said lifting members to further protect the underportion of the object.

11. Apparatus according to claim 4, further comprising a plurality of beams, each affixed to corresponding portions of each of said first portions of said shock absorbing means to enable conveyance of the mounted object while maintaining the shock mounting.

12. Apparatus according to claim 11, further comprising an enclosure fastened to said first portion of said shock absorbing means.

13. Apparatus according to claim 12, wherein said enclosure includes a plurality of substantially planar panels, and a plurality of angle braces affixing said panels together at the edges thereof.

* * * * *